United States Patent
Dawson et al.

(10) Patent No.: US 11,926,712 B2
(45) Date of Patent: Mar. 12, 2024

(54) AQUEOUS FORMULATIONS

(71) Applicant: Independence Oilfield Chemicals LLC, The Woodlands, TX (US)

(72) Inventors: Jeffrey Dawson, Conroe, TX (US); Chao Yang, Katy, TX (US); Kimberley MacEwen, Cypress, TX (US)

(73) Assignee: Independence Oilfield Chemicals LLC, The Woodlands, TX (US)

( * ) Notice: Subject to any disclaimer, the term of this patent is extended or adjusted under 35 U.S.C. 154(b) by 0 days.

(21) Appl. No.: 17/585,900

(22) Filed: Jan. 27, 2022

(65) Prior Publication Data

US 2022/0243016 A1 Aug. 4, 2022

Related U.S. Application Data

(60) Provisional application No. 63/143,311, filed on Jan. 29, 2021.

(51) Int. Cl.
| | |
|---|---|
| *C08J 3/05* | (2006.01) |
| *C08K 5/19* | (2006.01) |
| *C09K 8/68* | (2006.01) |
| *C09K 8/88* | (2006.01) |

(52) U.S. Cl.
CPC .................. *C08J 3/05* (2013.01); *C08K 5/19* (2013.01); *C09K 8/68* (2013.01); *C09K 8/882* (2013.01); *C08J 2333/26* (2013.01)

(58) Field of Classification Search
None
See application file for complete search history.

(56) References Cited

U.S. PATENT DOCUMENTS

| | | | |
|---|---|---|---|
| 2,761,840 A | 9/1956 | Brown et al. | |
| 3,349,032 A | 10/1967 | Krieg | |
| 4,293,427 A * | 10/1981 | Lucas | E21B 21/003 507/121 |
| 4,366,074 A | 12/1982 | McLaughlin et al. | |
| 5,097,904 A | 3/1992 | Himes | |
| 5,160,642 A | 11/1992 | Schield et al. | |
| 5,197,544 A | 3/1993 | Himes | |
| 7,601,675 B2 | 10/2009 | Poelker et al. | |
| 10,081,752 B2 * | 9/2018 | Wu | C09K 8/88 |
| 2004/0235677 A1 | 11/2004 | Nguyen et al. | |
| 2005/0155796 A1 * | 7/2005 | Eoff | C09K 8/68 175/72 |
| 2005/0284632 A1 * | 12/2005 | Dalrymple | C09K 8/5751 166/278 |
| 2009/0120642 A1 * | 5/2009 | Eoff | C09K 8/5086 166/280.2 |
| 2018/0112117 A1 * | 4/2018 | Wu | C11D 1/004 |
| 2018/0112118 A1 | 4/2018 | Wu et al. | |
| 2018/0112125 A1 | 4/2018 | Wu et al. | |
| 2020/0361891 A1 | 11/2020 | Arters et al. | |

FOREIGN PATENT DOCUMENTS

WO 2015011505 A1 1/2015

* cited by examiner

*Primary Examiner* — John J Figueroa
(74) *Attorney, Agent, or Firm* — Shumaker, Loop & Kendrick, LLP

(57) ABSTRACT

An aqueous formulation for slick water fracturing includes (i) a polymer (AA) which includes acrylamido repeat units and may be a polyacrylamide; (ii) water; and (iii) a quaternary ammonium compound.

36 Claims, 1 Drawing Sheet

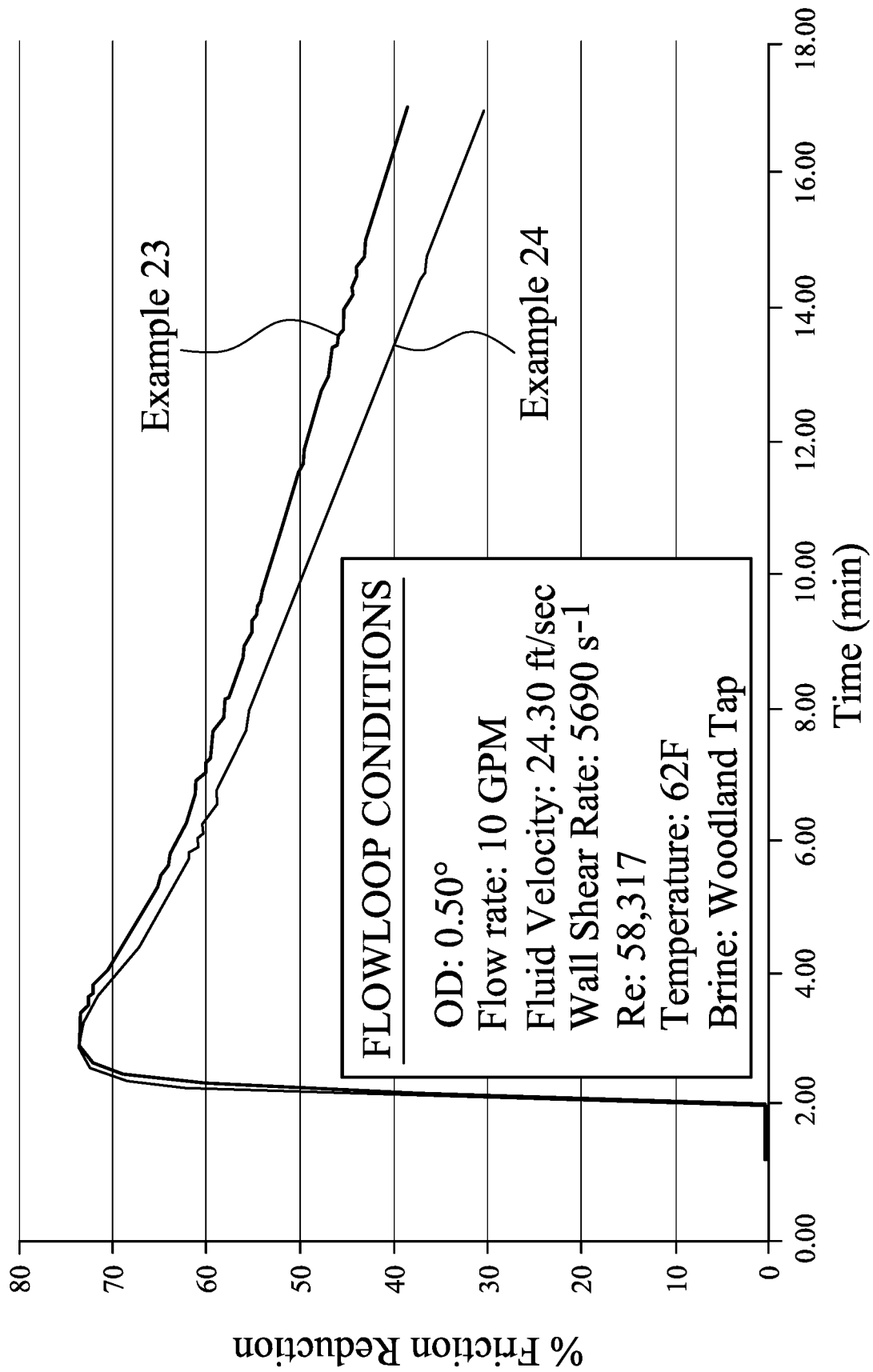

AQUEOUS FORMULATIONS

FIELD OF THE INVENTION

The present invention relates to aqueous formulations and particularly, although not exclusively, relates to use of such formulations in slick water fracturing, water treatment, enhanced oil recovery, drilling, erosion control, dust abatement and mining flotation operations.

BACKGROUND OF THE INVENTION

Hydraulic fracturing is a process needed to produce oil and gas from unconventional reservoirs such as coal beds, tight sandstones and shales. In this process, a fracturing fluid is injected at a rate and pressure necessary to cause formation failure by inducing fractures or cracks in the formation. These cracks originate at the well-bore and radiate out into the formation. The common practice in unconventional reservoirs is to initiate entry into the reservoir with a small slug of acid pumped at low rates followed by injection of a low viscosity water pumped at increasing rate until the design pump rate is achieved. These high rates typically can range from 50 to 100 barrels per minute. In order to pump at these high rates, small amounts of friction reducers are added to the fluid. The low viscosity, friction reducer assisted fluids are referred to as slick-water and the process or treatment is referred to as slick-water fracturing.

In hydraulic fracturing, polyacrylamide based polymers are often used to enhance oil and gas recovery. This fracturing process involves using significant quantities of a fracturing fluid with the main fluid being water that is pumped into an oil and/or gas containing formation under pressure to fracture the rock. Contained within the fracturing fluid is proppant. Generally, the proppant used is sand but could be a variety of other particles. The sand becomes trapped within the fractures and holds them open once pressure is reduced. This allows for improved flow of oil and gas from the formation. Polyacrylamide based polymers are used in the fracturing fluid as friction reducers where the polymer reduces turbulent flow of the fluid. This allows for a reduction in pumping pressure and a potential increase in pump rate. This can greatly reduce the cost of operation and time to complete the hydraulic fracturing process. Other components can also be added to the fracturing fluid to enhance performance of the fluid. For example, the fracturing fluid may include corrosion inhibitors, acids, fluid loss control additives, iron control additives, biocides, surfactants, scale inhibitors, clay control additives, foamers, paraffin inhibitors, gelling agents, pH adjustment additives, buffers, cross-linkers, oxidizing agents, enzymes and gel degrading agents.

Polyacrylamide based polymers for use in hydraulic fracturing are generally copolymers that are anionic or cationic charged. One of the more widely used polymers is a copolymer of acrylamide and acrylic acid metal salt. For hydraulic fracturing, the molecular weight of these polymers is very high. High molecular weight polyacrylamide based polymers allow for optimum friction reduction. During application, the polymer is mixed with the fracturing fluid that is primarily water based. Preferably, the polymer hydrates and dissolves in water as fast as possible. The fracturing fluid then becomes more resistant to turbulent flow thereby providing friction reduction as it is pumped into the formation.

Delivery of polymer compositions to hydraulic fracturing applications can be done in numerous ways. Polymer can be delivered as a powder, an emulsion, a slurry in an inert organic fluid, partially hydrated or already dissolved in water or combinations thereof. Powder polymer, while high in activity, generally needs specialized equipment to hydrate prior to use in a fracturing fluid. Slurry polymer, while lower in activity than powder polymer, can be expensive due to the use of a significant amount of inert fluid to suspend the particles. Polymer invert emulsions may have even lower polymer activity and can still be expensive due to the use of surfactants to stabilize the invert emulsions. Further, the surfactants and inert fluid used in slurries and invert emulsions may damage the formation and delay the time it takes for the polymer to hydrate. This can impact the performance in operations, for example fracturing, wherein a rapid hydration of the polymer is desirable.

In general terms, Applicant believes there is a need for formulations of polyacrylamide based polymers containing a high amount of active polymer which can be handled using standard machinery, which do not require additional steps and/or special equipment to hydrate the polymer and which do not contain additional fluids or surfactants which may damage the subterranean formation. One approach to the provision of such formulations would be to use aqueous formulations of polyacrylamido type polymers (e.g. polymers having a monomer that has an acrylamido functionality like acrylamide or AMPS). However, a problem with these formulations is that hydrophilic groups in the polymers hydrate if they come into contact with enough water molecules, producing a viscous, gelled formulation that is difficult to handle. It is known in the art that even very dilute aqueous solutions of acrylamide, for example a solution comprising 2 wt % of a polyacrylamido type polymer, will be viscous and hard to handle if the polymer is allowed to hydrate. Furthermore, there is a tendency for polyacrylamido-based polymers, which are, for example, slurried in water, to gel during storage, particularly if stored at relatively high temperatures for an extended period of time.

OBJECT OF THE INVENTION

It is an object of preferred embodiments of the present invention to provide an aqueous formulation which has a low susceptibility to gelling on storage over a range of temperatures and which can be readily mixed with water to produce an advantageous treatment fluid, which may, for example, be used as a fracturing fluid and in other uses.

SUMMARY OF THE INVENTION

According to a first aspect of the invention, there is provided an aqueous formulation, said formulation comprising:
(i) a polymer (AA) which includes acrylamido repeat units;
(ii) water;
(iii) a quaternary ammonium compound.

Applicant has found that the inclusion of quaternary ammonium compounds can prevent the hydration of acrylamido polymers in an aqueous formulation, thus creating a flowable formulation, which may not have the problems commonly associated with using invert emulsions, slurries or solid polymer powder. When small concentrations of the formulation are added to large volumes of water, such as a fracturing fluid, the quaternary ammonium compound is substantially diluted, allowing the acrylamido polymer to fully and rapidly hydrate. The ease of hydration renders the formulation useful in numerous applications requiring solutions of acrylamido polymers.

Furthermore, Applicant has additionally found that incorporating an additional salt (referred to as "salt (BB)" hereinafter) into the formulation of polymer (AA) and quaternary ammonium compound, can produce a formulation which will remain stable and flowable (e.g. the formulation will not significantly gel), when stored for an extended period of time and/or when exposed to elevated temperatures.

The aqueous formulations may be made up at a well site where they may be used immediately (in which case salt (BB) may not be required) or in advance away from the well site (in which case salt (BB) may be added to improve shelf life).

BRIEF DESCRIPTION OF THE DRAWINGS

These and other features, aspects and advantages of the present invention are better understood when the following detailed description of the invention is read with reference to the accompanying drawings, in which:

FIG. 1 is a graph of FR slurry in fresh water % Friction Reduction vs. Time.

DETAILED DESCRIPTION OF THE INVENTION

In this specification any reference to ppm is to parts per million by weight.

Said formulation preferably includes at least 1 wt %, preferably at least 5 wt %, of said polymer (AA). Said formulation may include less than 60 wt % or less than 50 wt % of said polymer (AA). Said formulation may include 1 to 60 wt %, preferably 5 to 45 wt %, of polymer (AA).

When said formulation includes more than one polymer, which includes acrylamide repeat units, the sum of the wt % of all polymers in said aqueous formulation, which include acrylamide repeat units, may be in the range 1 to 60 wt %, preferably in the range 5 to 45 wt %.

Said formulation may include at least 5 wt %, preferably at least 10 wt %, of water. Said formulation may include less than 80 wt % or less than 70 wt % of water. Said formulation may include 10 to 70 wt % of water.

Said formulation may include at least 5 wt %, preferably at least 8 wt %, of said quaternary ammonium compound. Said formulation may include 55 wt % or less, preferably 50 wt % or less. Said formulation may include 5 to 50 wt %, preferably 8 to 46 wt % of said quaternary ammonium compound.

When said formulation includes more than one quaternary ammonium compound, the sum of the wt % of all quaternary ammonium compounds (which preferably are non-polymeric salts, wherein each quaternary ammonium compound includes a cationic moiety) in said formulation is preferably in the range 5 to 50 wt %, more preferably in the range 8 to 45 wt %.

In said formulation, the ratio of the wt % water divided by the wt % of polymer (AA) may be in the range 0.1 to 12.9, preferably in the range 0.2-9.2.

When said formulation includes one or more types of polymer (AA), in said formulation, the ratio of the wt % water divided by the wt % of the sum of all types of polymer (AA) may be in the range 0.1 to 12.9, preferably in the range 0.2 to 9.2.

In said formulation, the ratio of the wt % of water divided by the wt % of said quaternary ammonium compound may be in the range 0.1 to 9.0, preferably in the range 0.3 to 6.0.

When said formulation includes one or more types of quaternary ammonium compound, in said formulation, the ratio of the wt % of water divided by the wt % of the sum of all types of quaternary ammonium compounds may be in the range 0.1 to 9.0, preferably in the range 0.3 to 6.0.

In said formulation, the ratio of the wt % of said polymer (AA) divided by the wt % of said quaternary ammonium compound may be in the range 0.15 to 5.5, preferably in the range 0.18 to 4.50.

When said formulation includes one or more types of polymer (AA) and more than one type of quaternary ammonium compound, in said formulation, the ratio of the sum of the wt % of all types of polymer (AA) divided by the wt % of all types of quaternary ammonium compounds may be in the range 0.15 to 5.5, preferably in the range 0.18 to 4.50.

Said formulation preferably includes 5 to 60 wt % (e.g. 10 to 45 wt %) of polymer (AA), 10 to 70 wt % of water and 5 to 50 wt % of said quaternary ammonium compound.

Preferably, said polymer (AA) is a polyacrylamide. Polymer (AA) may be an ionic polyacrylamide, a neutral polyacrylamide or a polyacrylamide wherein an acrylamide moiety has been grafted on to another polymer. In a preferred embodiment, said polymer (AA) is selected from an ionic polyacrylamide (especially an anionic acrylamide) or a neutral polyacrylamide.

When said polymer (AA) is an ionic polyacrylamide, said polymer (AA) may include 0-50 mol %, preferably 5-40 mol %, more preferably 10-30 mol % of ionic repeat units. The balance suitably comprises non-ionic acrylamide repeat units. Whilst polymer (AA) may be an anionic or cationic polyacrylamide, it is preferably an anionic polyacrylamide. Polymer (AA) may be partially hydrolysed acrylamide.

Said polymer (AA) preferably includes a repeat unit which includes an optionally substituted acrylamide, for example an alkylacrylamide (e.g. methacrylamide) or N,N-dialkylacrylamide (e.g. N,N-dimethylacrylamide). An optionally-substituted acrylamide repeat unit of polymer (AA) may be of formula I

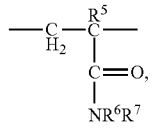

wherein $R^5$, $R^6$ and $R^7$ independently represent a hydrogen atom or an optionally-substituted (preferably unsubstituted) $C_{1-4}$ alkyl, preferably $C_{1-2}$ alkyl, more preferably a methyl group.

In formula I, $R^5$, $R^6$ and $R^7$ preferably represent hydrogen atoms.

On average, the ratio of the number of other repeat units in polymer (AA) divided by the number of repeat units of formula I may be less than 0.6, 0.5, 0.4, 0.3 or 0.2. Said ratio may be at least 0.0025, at least 0.005, at least 0.05 or at least 0.1.

Said polymer (AA) may include (e.g. in combination with repeat unit of formula I) a repeat unit which includes an acrylate or sulfonate moiety, for example an acrylate or sulfonate salt, or a pyrrolidone moiety. Polymers, which include sulfonate salts, may be preferred when the formulation is used with water, which includes high levels of hardness ions, for example magnesium, calcium, strontium, barium or ferrous ions.

Said polymer (AA) may include a repeat unit of formula II which is preferably in combination with a repeat unit of formula I. A repeat unit comprising a moiety of formula II may comprise a moiety:

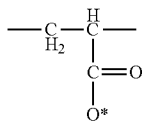
II wherein the O* moiety is an O⁻ moiety or is covalently bonded to another atom or group;
a repeat unit comprising a vinyl pyrrolidone moiety; or
a repeat unit comprising a moiety of formula III

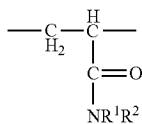
III wherein $R^1$ and $R^2$ are independently selected from a hydrogen atom and an optionally-substituted alkyl group. An optionally-substituted alkyl group may define an electrically neutral hydrophobe. An optionally-substituted alkyl group may incorporate an —$SO_3R^3$ moiety wherein $R^3$ is selected from a hydrogen atom and a cationic moiety, for example an alkali metal cation, especially $Na^+$. Said optionally-substituted alkyl group may include 1 to 36, preferably 1 to 20, more preferably 1 to 10 carbon atoms. Said repeat unit may be derived from and/or based on 2-acrylamido-2-methylpropane sulfonic acid, commonly referred to as ATBS or AMPS.

Said polymer (AA) may include a repeat unit comprising a moiety of formula III

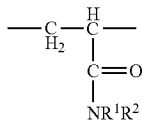
III wherein $R^1$ and $R^2$ are independently selected from a hydrogen atom and an optionally-substituted alkyl group, wherein at least one of $R^1$ and $R^2$ includes an alkyl group incorporating an —$SO_3R^3$ moiety wherein $R^3$ is selected from a hydrogen atom and a cationic moiety, for example an alkali metal cation, especially $Na^+$. Said polymer (AA) comprises 100 mol % of repeat units of formula III and is, preferably, polyAMPS.

When polymer (AA) includes anionic repeat units, which include sulfonate moieties, preferably, said anionic repeat units are styrene sulfonate or AMPS-based repeat units.

Said polymer (AA) may include acrylamide repeat units in combination with acrylate and/or AMPS-based repeat units.

Said polymer (AA) may include 1-50 mol %, preferably 10-40 mol %, of anionic comonomeric moieties, for example acrylate and/or AMPS-based repeat units.

Polymer (AA) may be derived from one or more of the following monomers:

Cationic monomers—Methacryloyloxyethyltrimethylammonium chloride, Methacrylamidopropyltrimethylammonium chloride, Acryloyloxyethyltrimethylammonium chloride, Dimethyldiallylammonium chloride, 1,3-bis(N,N,N-trimethylammonium)-2-propylmethacrylate dichloride, 1,3-bis(N,N,N-trimethylammonium)-2-propylacrylate dichloride.

Anionic monomers—Sodium Acrylate, Sodium 2-Acrylamido-2-methylpropane sulfonate; sodium vinyl sulfonate, sodium methacrylate, methyl methacrylate, 4-vinyl benzylsulfonate, 4-isopropenyl-benzoate, vinyl phosphonate.

Non-ionic Monomers—Acrylamide, Methacrylamide, N,N Dimethylacrylamide, Vinyl pyrolidonone.

Polymer (AA) is preferably derived from the aforementioned anionic monomers and non-anionic monomers.

Polymer (AA) may include monovalent (e.g. $NH_4^+$, $Li^+$, $Na^+$, $Rb^+$ or $Cs^+$), divalent (e.g. $Be^{2+}$, $Mg^{2+}$, $Ca^{2+}$, $Sr^{2+}$, $Ba^{2+}$, $Fe^{2+}$, $Cu^{2+}$ or $Zn^{2+}$) or trivalent (e.g. $Fe^{3+}$ or $Al^{3+}$) cations. It preferably includes monovalent cations, with $Na^+$ being preferred.

Said polymer (AA) preferably includes acrylamide repeat units and acrylate, for example sodium acrylate, repeat units.

Said polymer (AA) may have a molecular weight of at least 200,000 Daltons. Said molecular weight may be at least 500,000 Daltons, preferably at least 1,000,000 Daltons. The molecular weight may be less than 50,000,000 Daltons or less than 30,000,000 Daltons. Molecular weight, described herein, may be measured by Measurement of Intrinsic Viscosity (see ISO 1628/1-1984-11-01); and using Intrinsic Viscosity/Molecular Weight Correlation via the Mark-Houwink Equation). Said molecular weight may be in the range 15,000,000-20,000,000 Daltons.

Polymer (AA) is preferably dispersed in said aqueous formulation, suitably as solid discrete particles. The particles may be in the form of powder, granules or flake. Unless otherwise stated, particles sizes are measured using a Beckman Coulter Laser Particle Size Analyser LS13320. Said particles preferably have a mean particle diameter of at least 100 μm, at least 200 μm or at least 300 μm. Said mean particle diameter may be less than 1000 μm, for example less than 700 μm or less than 500 μm. At least 90 wt %, preferably at least 98 wt %, more preferably about 100 wt % of said particles of said polymer (AA) have a diameter greater than 1 μm, greater than 10 μm or greater than 20 μm. Said particles of said polymer (AA) suitably have a diameter less than 2000 μm, or less than 1100 μm. Said particles of said polymer (AA) may include less than 15 wt %, preferably less than 5 wt % water.

The particle sizes of the polymer used may have multimodal for example bimodal or tri-modal particle distributions so that hydration rates may be adjusted according to the requirement of the application, for example to match pipe residence times during the fracturing process. Smaller sized particles would be selected for applications where there are short residence times. Bimodal particle distributions comprising small particles that rapidly hydrate and larger particles that take longer to hydrate may be used in applications where there are long residence times, for example fracturing in extended well-bores.

Said quaternary ammonium compound may be a mono quaternary ammonium compound, a bisquaternary ammonium compound or a polymeric quaternary ammonium compound. A mono quaternary ammonium compound may be a choline, a tetraalkylammonium compound; or a cyclic quaternary ammonium compound, for example a pyridinium compound as described in U.S. Pat. Nos. 2,761,840, 5,197, 544 and 5,097,904. A bisquaternary ammonium compound may be of the formula [X]Q-L-QX]; wherein X is an anion, Q is a quaternary ammonium group (which may be a tetraalkyl or cyclic group) and L is a linking group (for example alkyl, 2-hydroxy propyl or aryl) as described in U.S. Pat. No. 3,349,032 and US20040235677. Examples of polymeric quaternary ammonium compounds include (co) polymers of quaternised amino ethyl methacrylates for example those taught in U.S. Pat. No. 4,366,074 and polymers of maleic anhydride derivatives for example those taught in U.S. Pat. Nos. 5,160,642 and 7,601,675. A polymeric quaternary ammonium compound may also be a (co)polymer of quaternised amino ethyl methacrylates as described in U.S. Pat. No. 4,366,074 or a polymer of maleic anhydride derivatives as described in U.S. Pat. Nos. 5,160, 642 and 7,601,675.

Said quaternary ammonium compound may be selected from a mono quaternary ammonium compound, a bisquaternary ammonium compound a polymeric quaternary ammonium compound, or combinations thereof.

Said quaternary ammonium compound is preferably a salt. It suitably includes a quaternary ammonium cation and an anionic moiety. Said anionic moiety may be selected from a halide, for example fluoride, chloride, bromide or iodide; salicylate; oxalate; bicarbonate; bitartarate; citrate; carbonate; dihydrogen citrate; nitrate; nitrite; phosphate; sulfate; sulfonate. Said anionic moiety is preferably selected from a halide, for example, chloride.

Said quaternary ammonium compound may be prepared using a quaternising agent. Suitable quaternising agents are known to one skilled in the art of preparing quaternary ammonium compounds and are taught for example in US20200361891 and WO2015011505. Preferred quaternising agents include: alkyl or alkenyl esters of carboxylic acids: including α-hydroxy esters, especially methyl salicylate and mono- or di- or tri-esters of citric acid; esters of polycarboxylic acids, especially dimethyl oxalate; benzyl halides including benzyl chloride and benzyl bromide, alkyl halides especially methyl chloride, methyl bromide and methyl iodide; dialkyl sulfates, especially dimethyl sulfate; epoxide quaternising agents for example ethylene oxide, propylene oxide and styrene oxide, optionally in combination with an additional acid; alkyl nitrobenzoate esters, especially methyl 2-nitrobenzoate or methyl 3-nitrobenzoate; alkyl carbonates including dimethyl carbonate; alkyl nitrates; alkyl nitrites; halohydrins especially 2-chloroethanol; or sodium chloroacetate.

An ion exchange reaction may be used to change said anionic moiety. For example, the quaternary ammonium compound may be prepared using an alkyl halide or benzyl halide and subjected to an ion exchange reaction to provide a different anion as part of the quaternary ammonium compound. Such a method may be suitable to prepare quaternary ammonium compounds wherein the anionic moiety is a hydroxide, alkoxide, nitrite or nitrate.

Said quaternary ammonium compound may include a moiety

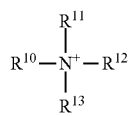

(XI)

wherein $R^{10}$, $R^{11}$, $R^{12}$ and $R^{13}$ is each individually an optionally substituted alkyl, alkenyl or aryl group; or two of groups $R^{10}$, $R^{11}$, $R^{12}$ and $R^{13}$ may together define a cyclic structure.

In this specification, unless otherwise stated in the context of said quaternary ammonium compound, references to optionally substituted alkyl groups may include aryl-substituted alkyl groups and references to optionally-substituted aryl groups may include alkyl-substituted or alkenyl-substituted aryl groups. Preferred aryl substituted alkyl groups are benzyl groups.

Said moiety of formula (X) may include a single quaternary ammonium moiety or may include two quaternary ammonium moieties and may, for example, be a diquaternary ammonium moiety. Preferably, said moiety of formula (X) includes a single quaternary ammonium moiety and/or a single nitrogen atom.

$R^{10}$, $R^{11}$, $R^{12}$ and $R^{13}$ may be independently selected from hydroxyalkyl groups, especially hydroxymethyl, 1-hydroxyethyl, 2-hydroxyethyl, 2-hydroxypropyl, 3-hydroxypropyl], benzyl and $C_{1-25}$, preferably $C_{1-10}$ hydrocarbyl groups, especially methyl, ethyl, propyl, isopropyl and butyl.

Preferably, $R^{10}$, $R^{11}$, $R^{12}$ and $R^{13}$ represent optionally-substituted alkyl groups. Preferred alkyl groups are $C_{1-4}$ alkyl groups. Preferably, $R^{10}$, $R^{11}$ and $R^{12}$ each represent an unsubstituted $C_{1-4}$ alkyl group. Preferably, each of $R^{10}$, $R^{11}$ and $R^{12}$ represents the same, unsubstituted, alkyl group. $R^{10}$, $R^{11}$ and $R^{12}$ preferably each represent a $C_{1-3}$ alkyl group. In a preferred embodiment, $R^{10}$, $R^{11}$ and $R^{12}$ each represent methyl groups.

In a preferred embodiment, $R^{13}$ represents a group —$(CH_2)_m$ X wherein m is an integer, preferably in the range 1 to 4 and X represents a hydrogen atom or a polar moiety. Said polar moiety may be selected from —OH, —$SO_3H$.

Preferably, a cation of said quaternary ammonium compound is selected from choline, tetramethylammonium, tetraethylammonium, tetrapropylammonium, tetrabutylammonium and imidazolinium; and an anion of said quaternary ammonium compound is selected from chloride, bromide and iodide. Said quaternary ammonium compound may be selected from choline chloride, tetramethyl ammonium chloride, tetraethylammonium chloride and tetrapropyl ammonium chloride. Preferably, said quaternary ammonium compound is a tetraalkylammonium compound.

Said aqueous formulation preferably includes a salt (BB) in addition to components (i), (ii) and (iii). Said salt (BB) is suitably not a quaternary ammonium compound. In the formulation, the salt (BB) appears to act as a specific density modifier which facilitates the suspension of the polymer (AA). Alternatively and/or additionally, salt (BB) suitably helps to improve stability and flowability of the formulation after extended storage and/or when exposed to elevated temperatures.

Said formulation suitably includes at least 2 wt %, preferably at least 4 wt %, of said salt (BB). Said formulation may include less than 30 wt %, preferably less than 20 wt %, of said salt. Said formulation may include 2 to 30 wt %, preferably 3 to 25 wt %, of said salt (BB).

When said formulation includes more than one salt (BB), the sum of the wt % of all salts (BB) is suitably at least 2 wt %, preferably at least 4 wt %. In said formulation, the sum of the wt % of each salt (BB) may be less than 30 wt %, preferably less than 20 wt %. Said formulation may include 2 to 30 wt % in total of salts (BB), preferably 3 to 25 wt %, in total of salts (BB).

The sum of the wt % of said quaternary ammonium compound and said salt (BB) is preferably at least 1 wt %, more preferably at least 20 wt %. Said sum may be less than 70 wt %, preferably less than 63 wt %. Said sum may be in the range 10 to 70 wt %, preferably in the range 20 to 60 wt %.

When said formulation includes one or more quaternary ammonium compounds and one or more salt (BB), in said formulation, the sum of the wt % of all quaternary ammonium compounds and all salts (BB) is preferably at least 1 wt %, preferably at least 15 wt %. Said sum may be less than 70 wt %, preferably less than 63 wt %. Said sum may be in the range 10 to 70 wt %, preferably in the range 15 to 60 wt %.

In said formulation, the ratio of the wt % of water divided by the wt % of said salt (BB) may be at least 0.6. Said ratio may be less than 14.0.

In said formulation, the ratio of the wt % of water divided by the sum of the wt % of said quaternary ammonium compound and said salt (BB) may be at least 0.2, preferably at least 0.4. Said ratio may be less than 6.8, preferably less than 3.6.

In said formulation, the ratio of the wt % of water divided by the sum of the wt % of all quaternary ammonium compounds and all salts (BB) may be at least 0.2, preferably at least 0.4. Said ratio may be less than 6.8, preferably less than 3.6.

In said formulation, the ratio of the wt % of polymer (AA) divided by the sum of the wt % of said quaternary ammonium compound and said salt (BB) may be at least 0.10, preferably at least 0.12. Said ratio may be less than 6.00, preferably less than 3.80.

In said formulation, the ratio of the wt % of salt (BB) divided by the wt % of said quaternary ammonium compound may be at least 0.001, preferably at least 0.01. The ratio of the wt % of salt (BB) divided by the wt % of said quaternary ammonium compound may be in the range 0.001 to 100, for example 0.01 to 10 or 0.05 to 5.

Preferably, in said formulation the sum of the wt % of each polymer (AA), water, each quaternary ammonium compound and each salt (BB) is at least 90 wt %, preferably at least 95 wt %, more preferably at least 98 wt %.

Preferably, in said formulation the sum of the wt % of a polymer (AA), water, a quaternary ammonium compound and a salt (BB) is at least 90 wt %, preferably at least 95 wt %, more preferably at least 98 wt %.

Said salt (BB) may be an alkali or alkaline earth metal salt. It is preferably an alkaline earth metal salt, with calcium and magnesium salts being preferred. The counter-ion may be selected from monovalent anions, for example from acetate, formate, halide, nitrate, nitrite, sulfonate (e.g. taurate) and isethionate. Preferred counter-ions are halides, with chloride being especially preferred. Salt (BB) is preferably selected from calcium chloride and magnesium chloride.

Salt (BB) may be a salt or hydrate of a salt.

Said formulation optionally include water miscible solvents, at up to 5 wt %, such as lower alkanols, especially methanol, ethanol, isopropanol and glycols such as ethylene glycol. The amount may be selected based on the salt content of the formulation to prevent the salt from being precipitated out.

Said formulation may include a suspending agent. Said formulation may include 0-5 wt %, preferably 0-1 wt %, of said suspending agent, which may be a clay-suspending agent which preferably is selected from attapulgite, laponite and derivatives thereof; or a polymeric suspending agent, especially a polysaccharide-suspending agent such as Diutan. In another embodiment, the formulation may include 1-5 wt % of said suspending agent.

Said formulation may have a suspension viscosity measured on a Brookfield LVT machine with LV spindle at 30 rpm and at 20° C. (68° F.) of 1000-15000 cP. Said formulation may have an apparent density in the range 1.05-1.48 g/l.

Suitably, formulations described are stable and do not gel. Preferably, they are not a gel and do not gel over time. More preferably the formulations do not gel when exposed to elevated temperatures for example 150° F. (65.6° C.) or even 180° F. (82.2° C.) for extended periods of time, for example 1 week. The skilled person would be able to determine that the formulations do not gel by visual inspection to confirm the formulations remain uniform or homogenous and are pourable from their storage containers at room temperature (e.g. 22° C.).

A preferred aqueous formulation comprises:
5-50 wt %, preferably 20-45 wt %, of a polymer (AA) which includes acrylamido repeat units;
water;
5-50 wt %, preferably 8-46 wt % of a quaternary ammonium compound, preferably a choline salt; and
2-30 wt %, preferably 3-25 wt % of a calcium or magnesium halide, preferably calcium chloride.

An especially preferred aqueous formulation comprises:
5-50 wt %, preferably 20-45 wt %, of a polymer (AA) which includes acrylamido repeat units and includes 5-35 mol % of anionic comonomeric moieties, for example acrylate and/or AMPS-based repeat units;
water;
5-50 wt %, preferably 8-46 wt %, of a quaternary ammonium compound, preferably a choline salt; and
2-30 wt %, preferably 3-25 wt %, of a calcium or magnesium halide, preferably calcium chloride; and
0-5 wt % of a clay-suspending agent.

According to a second aspect, there is provided a method of preparing a treatment fluid, the method comprising:
(a) selecting an aqueous formulation according to the first aspect; and
(b) contacting the aqueous formulation with water.

Preferably, said treatment fluid comprises 0.4-15 lb polymer (AA) per 1000 gal of treatment fluid and more preferably includes 0.75-10 lbs polymer (AA) per 1000 gal fluid of treatment fluid.

Any reference to Gallons herein refers to US Gallons.

The fluid may be a fracturing fluid. As a result of the contact and/or mixing of said aqueous formulation with water, the polymer (AA) mixes with and/or is solubilised by the water. The fracturing fluid so formed exhibits a lower friction in use compared to that of water and/or such lower friction may be achieved rapidly on contact between formulation (A) and water.

Water which is mixed with said aqueous formulation may be derived from any convenient source. It may be potable water, surface water, seawater, brine, flow-back water, aquifer water or produced water. References herein to amounts of water, particularly in the context of water which forms a major part of a fracturing fluid described, suitably refer to water inclusive of components present in the source of water, such as dissolved salts found in sea water.

The method may comprise making a fracturing fluid, which includes 25 to 10,000 ppm, 250 to 6,300 ppm, 440 to 3,800 ppm or 630 to 1,900 ppm of said aqueous formulation in water.

In the method, other additives may be contacted with said aqueous formulation after and/or concurrently with water.

Said other additives may be selected from corrosion inhibitors, proppant particulates, acids, fluid loss control additives, biocides, surfactants and scale inhibitors, clay control additives, foamers optionally accompanied with gasses such as air, natural gas, $N_2$ or $CO_2$ to form a foam, paraffin inhibitors, gelling agents, pH adjustment additives, buffers, cross-linkers, oxidizing agents, enzymes and gel degrading agents.

Preferably, at some stage in the method, one or a plurality of proppants is incorporated into the fracturing fluid. The proppant may have a size of at least 140 US Mesh; it may have a size of less than 5 US Mesh. The proppant may be selected from sand, bauxite, and man-made intermediate or high strength materials. A preferred proppant is 100 mesh sand. The proppant is arranged to restrict close down of a fracture on removal of hydraulic pressure which caused the fracture.

In a preferred embodiment, the fracturing fluid comprises water, proppant, biocide and scale inhibitor additives.

Preferably, at some stage in the method, said fracturing fluid includes 2.9 to 54 wt %, for example 5 to 40 wt %, of proppants.

According to a third aspect, there is provided a treatment fluid, optionally prepared as described in accordance with the second aspect, the treatment fluid comprising:
(i) a polymer (AA) which includes acrylamido repeat units;
(ii) water; and
(iii) a quaternary ammonium compound.

Preferably, said treatment fluid comprises 0.4-15 lb (48-1,800 ppm) polymer (AA) per 1000 gal of treatment fluid and more preferably includes 0.75-10 lbs (90-1,200 ppm) polymer (AA) per 1000 gal fluid of treatment fluid.

The fluid may be a fracturing fluid.

According to a fourth aspect, there is provided a method of treatment, which comprises:
(A) selecting a treatment fluid according to the third aspect;
(B) contacting an area to be treated with said treatment fluid.

Said treatment may be selected from slick water fracturing, water treatment, enhanced oil recovery, drilling, erosion control, dust abatement and mining flotation operations. Said treatment is preferably a slick water fracturing treatment.

According to a fifth aspect of the invention, there is provided the use of an aqueous formulation of the first aspect for preparing a treatment formulation of the third aspect and/or for use in the method of the fourth aspect.

According to a sixth aspect, there is provided the use of a treatment formulation for slick water fracturing, water treatment, enhanced oil recovery, drilling, erosion control, dust abatement and mining flotation operations. Said treatment is preferably a slick water fracturing treatment. Said use is preferably for slick water fracturing.

According to a seventh aspect of the invention, there is provided an assembly positioned adjacent to a well communicating with a subterranean formation, said assembly being arranged to deliver a treatment fluid, for example a fracturing fluid into the formation, said assembly comprising:
(I) a receptacle containing an aqueous formulation according to the first aspect;
(II) a water supply;
(III) a pump (PI) and optional flow meter for dosing aqueous formulation from said receptacle into said water supply, suitably to define at least part of a fracturing fluid;
(IV) a conduit for delivering fracturing fluid into the formation; and
(V) a pump (P2) for injecting the fracturing fluid via said conduit into the formation.

According to an eighth aspect of the invention, there is provided a method of making a formulation according to the first aspect, the method comprising:
(i) making an aqueous solution comprising a quaternary ammonium compound;
(ii) contacting the aqueous solution with a polymer (AA) in powder form.

Step (i) may comprise any of the following:
(a) the addition of salt (BB) when being used;
(b) adding a suspending agent to water then adding the quaternary ammonium compound; and/or
(c) adding a suspending agent to water then adding the quaternary ammonium compound and salt (BB).

Any aspect of any invention described herein may be combined with any feature described in any other aspect of any invention or embodiment described herein mutatis mutandis.

SPECIFIC EMBODIMENTS OF THE INVENTION

Specific embodiments of the invention will now be described, by way of example, with reference to the accompanying FIGURE, in which FIG. 1 is a graph of friction reduction against time for selected examples.

The following materials are referred to hereinafter:

Tetramethyl Ammonium Chloride (TMAC) (quaternary ammonium compound) solution—a commercially available solution containing 50-55 wt % active;

Choline Chloride solution (quaternary ammonium compound)—a commercially available solution containing 70-75 wt % active;

Tetrapropyl Ammonium Chloride (TPAC) (quaternary ammonium compound) solution—a commercially available solution containing 50-55 wt % active;

Attagel 50—A commercially available attapulgite clay-suspending agent;

Laponite RD—a commercially available modified phyllosilicate clay-suspending agent;

Diutan—a commercially available Diutan gum suspending agent;

Friction reducer Polymer (I)—refers to partially-hydrolyzed polyacrylamide (PHPA) including 25-30% acrylate units, with molecular weight 10-25 million Da;

Friction reducer Polymer (II)—refers to AMPS-acrylamide copolymer including 10% mol % AMPS, with molecular weight about 8-12 million Da; and Friction reducer Polymer (III)—refers to AMPS-acrylamide copolymer, including 30% mol % AMPS, with molecular weight about 5-10 million Da.

Examples 1 to 24—Preparation of Polymer Slurries for Testing

Into a beaker equipped with temperature probe and stirrer, there was charged tap water. Suspending agent was added and the mixture was stirred at high shear for 30 minutes at ambient temperature. Quaternary ammonium compound was added and mixed for 10 minutes. Then any alkaline salt to be included was added and mixed for 15 minutes. Then friction reducer polymer was added in slowly and the mixture was mixed for 15 minutes to define a final slurry.

The formulations detailed in the table below were prepared:

| | Quaternary ammonium compound | | | | Salt | | Stabilizer | | | Friction reducing polymer | | |
|---|---|---|---|---|---|---|---|---|---|---|---|---|
| | Tetramethyl Ammonium Chloride | Choline Chloride | Tetrapropyl Ammonium | | | | | | | Friction reducer | Friction reducer | Friction reducer |
| Example No | solution (i)/wt % | solution (ii)/wt % | Chloride/ wt % | Water/ wt % | $CaCl_2 \cdot 2H_2O$/ wt % | $MgCl_2 \cdot 6H_2O$/ wt % | Attegel/ wt % | Laponite RD/wt % | Diutan/ wt % | Polymer (I) wt % | Polymer (II) wt % | Polymer (III) wt % |
| 1 | 32.8 | — | — | 39 | 19.7 | — | 2 | — | — | 6.5 | — | — |
| 2 | 22.5 | — | — | 26.9 | 13.6 | — | 1 | — | — | 36 | — | — |
| 3 | 34.4 | — | — | 15 | 11.5 | — | 1.1 | — | — | 38 | — | — |
| 4 | 37.9 | — | — | 39.7 | 5.7 | — | 1.5 | — | — | 15.2 | — | — |
| 5 | 31 | — | — | 32 | 5 | — | 1 | — | — | 31 | — | — |
| 6 | 41.2 | — | — | 12.4 | 12.4 | — | 1 | — | — | 33 | — | — |
| 7 | — | — | 19.1 | 48.3 | 11.5 | — | 2 | — | — | 19.1 | — | — |
| 8 | — | — | 16.9 | 42.8 | 10.6 | — | 1.7 | — | — | 28 | — | — |
| 9 | — | 13.5 | — | 31 | 13 | — | 0.5 | — | — | 42 | — | — |
| 10 | — | 46 | — | 25 | 15 | — | 1 | — | — | 13 | — | — |
| 11 | — | 23 | — | 22 | 15 | — | 3 | — | — | 37 | — | — |
| 12 | — | 39 | — | 10 | 15 | — | — | 1 | — | 35 | — | — |
| 13 | — | 37.2 | — | 9.5 | 14.5 | — | — | 0.7 | — | 38.1 | — | — |
| 14 | — | 25.6 | — | 24.6 | 14.7 | — | — | — | 0.1 | 35 | — | — |
| 15 | 23 | — | — | 41 | — | 9 | 2 | — | — | 25 | — | — |
| 16 | — | 42 | — | 28 | — | 8 | 2 | — | — | 20 | — | — |
| 17 | 23 | — | — | 34 | — | 10 | 2 | — | — | 31 | — | — |
| 18 | 17.5 | — | — | 41.4 | — | 18 | 2.1 | — | — | 21 | — | — |
| 19 | — | 23.8 | — | 38.5 | — | 16 | 1.3 | — | — | 20.4 | — | — |
| 20 | — | 21 | — | 34 | — | 14 | 1 | — | — | 30 | — | — |
| 21 | — | 54 | — | — | 6 | — | 2 | — | — | — | 38 | — |
| 22 | — | 55 | — | — | 6 | — | 2 | — | — | — | — | 37 |
| 23 | — | 88 | — | — | — | — | 2 | — | — | 10 | — | — |
| 24 (Comparative)* | | | | | | | | | | 100 | | |

*The comparative example was a commercially available polyacrylamide powder.

Example 25—Stability Testing

Slurries described in selected Examples were placed in a forced air oven at constant temperatures of 120° F. or 150° F. for storage periods of 1, 2 or 3 weeks. After elapse of the selected storage period, the samples were removed from the oven and the flowability and gravity driven separation were tested by visual inspection. A summary of the test conditions is provided below:

| Example | Flowability Test |
|---|---|
| Example 1 | 150° F. 3 weeks |
| Example 2 | 150° F. 1 weeks |
| Example 3 | 150° F. 1 weeks |
| Example 4 | 180° F. 1 weeks |
| Example 5 | 150° F. 1 weeks |
| Example 6 | 180° F. 1 weeks |
| Example 7 | 150° F. 1 weeks |
| Example 8 | 150° F. 1 weeks |
| Example 9 | 150° F. 1 weeks |
| Example 10 | 150° F. 3 weeks |
| Example 11 | 150° F. 3 weeks |
| Example 12 | 150° F. 3 weeks |
| Example 13 | 150° F. 1 weeks |
| Example 14 | 120° F. 2 weeks |
| Example 15 | 120° F. 3 weeks |
| Example 16 | 120° F. 3 weeks |
| Example 17 | 120° F. 3 weeks |
| Example 18 | 120° F. 3 weeks |
| Example 19 | 120° F. 3 weeks |
| Example 20 | 120° F. 3 weeks |
| Example 21 | 120° F. 3 weeks |
| Example 22 | 120° F. 3 weeks |

A pass/fail was determined by visual inspection of whether the formulation was still uniform/homogenous and pourable from the container at the end of the test. All of the examples passed the test. Otherwise, comparable formulations which did not include a quaternary ammonium compound and/or salt were found to fail the test.

Example 26—General Procedure for Flow-Loop Testing of Formulations

A flow loop device is used to examine friction reduction as a function of time. Not having maximal friction reduction and/or rapid dissolution times can mean a loss in polymer performance that could impact the cost and time of a hydraulic fracturing operation. Low polymer performance can also impact oil well production if proppant carrying and placement in the formation is impacted. The flow loop used was composed of two 10 ft pipes in sequence, one ¾ inch and the other ½ inch. The water used came from tap water and was held in a 5 gallon reservoir tank, equipped with an overhead stirrer. The fluid was recirculated through the pipes and reservoir using a Moyno 5 pump. The flow rate in each test was held constant at 10 gal/min. Initially, Test water was pumped for two minutes at constant rate to establish a baseline. After two minutes, a friction reducer to be tested was added to the reservoir tank with 30 seconds of vigorous mixing to assure uniform distribution of friction reducer while also flowing through the flow loop plumbing. The pressure drop across the length of each pipe, the flow rate through each pipe and the fluid temperature was continuously recorded, with data being collected at a rate of one data point per second. At the completion of each test, the flow rate, temperature and the percent friction reduction (calculated as $1-(\Delta P\ FR/\Delta P\ water)$, were plotted against time.

The following formulations were assessed:

| Example No. of friction reducer formulation used | Diluent liquid | Time (secs) to maximum % friction reduction | Maximum % Friction Reduction |
|---|---|---|---|
| 9 | Tap water | 28 | 69.8 |
| 11 | Tap water | 27 | 71.9 |
| 11 | Sea water | 42 | 56 |
| 16 | Tap water | 25 | 60.2 |
| Comparative Example (comprising a 42 wt % loading of a conventional friction reducer) | Tap water | 40 | 67.3 |

It will be appreciated that the friction reducer formulations described provided excellent friction reduction characteristics.

Example 27—Flow-Loop Testing of Formulation of Example 23

Following the general procedure of Example 26 the formulation of Example 23 was added to water and tested in a flow loop and compared to an equivalent formulation in the absence of the salt. Results are provided in FIG. 1 from which it will be appreciated that the formulation provides excellent friction reduction and the reduction may be more long lived compared to the comparative formulation.

Thus, it is clear from the examples that formulations can be prepared which exhibit long term stability. When small concentrations of the formulations are added to large volumes of water, such as for a fracturing fluid, the quaternary ammonium compound and/or salt are substantially diluted, allowing the acrylamide polymer to fully and rapidly hydrate to produce a friction reduction effect, which may be sustained for a relatively long period. If long shelf life is not needed, such formulations may not require the addition of any salt over and above the inclusion of a quaternary ammonium compound. Such formulations may be made up close to the point of use and used soon after preparation. Alternatively, formulations may be made up remote from the point of intended use and/or stored prior to use. In this case, it is preferred that the formulations include both a quaternary ammonium compound and salt.

Example 28—Field Trial of a Formulation

Formulation (A) was prepared by mixing the following components

| Components | Quantity (% by wt) |
|---|---|
| Choline Chloride | 13 |
| Tap Water | 25 |
| Suspending agent | 3 |
| Calcium chloride | 20 |
| AMPS—acrylamide copolymer including 10% mol % AMPS | 39 |

This composition was mixed to provide four 275 gallon totes of product and was sent to a horizontal well site drilled and cased in the Wolfcamp and Bone Springs formations in Lea County, N. Mex. The well was cased with 5.5" P-110 20 #steel with the TVD at 10,187'. This interval or stage treated with Formulation (A) was perforated with numerous perf clusters.

The water used for the fracturing treatment was produced water having the following characteristics:
pH=6.9,
Total Dissolved Solids [TDS] at 140,000 ppm,
3720 ppm divalent ions and 1 ppm iron.

The rigup for the trial consisted of spotting the totes on a tote rack with a 2" line from the tote to the friction reducer education pump skid utilizing a (2CL-3) Continental barrel pump that meters through a 1" single tube E&H Coriolis flow meter, then to the blender tub. The 2" suction line can range from 10' to 30', while the 1" discharge hose can range from 50' to 150'. Arriving at the 5 bbl blender tub, the friction reducer is mixed with the frac water, sand, biocide and scale inhibitor additives. The proppant for the treatment was 100 mesh sand with the maximum loading of 2.5 lb sand/gallon of fluid.

This test was designed to compare the performance of Formulation (A) with HiRate D60 (a commercially available friction reducer composition available from Innospec Oilfield Services), which is a pre-hydrated 2% polyacrylamide solution, pumped to deliver friction reducer polymer equivalent to 0.8 gal/1000 gal (gpt) or 2.5 lb of polyacrylamide per 1000 gallons of water. The performance criteria were the new products effect on the treating pressure. The desired pump rate was 95 barrels per minute (3990 gpm or 15.1 m³/min). The treatment was a continuous fracturing process where the friction reducer product was charged in a continuous manner. The pressure reading was taken after sufficient time had passed for all the previous product to have passed through the wellbore.

Treating Pressure Results

| FR Loading (gpt) | FR Product | Treating Pressure (psi) | Rate (BPM) | Proppant (lb/gal) | Difference in Pressure (psi) |
| --- | --- | --- | --- | --- | --- |
| 0.80 | HiRate D60 | 10,240 | 89.3 | 1.0 | Baseline |
| 0.40 | Formulation (A) | 9,145 | 90.3 | 1.0 | −1,095 |
| 0.40 | Formulation (A) | 9,645 | 95.0 | 1.0 | −595 |
| 0.30 | Formulation (A) | 10,027 | 95.0 | 1.0 | −213 |
| | | Diverter Drop | | | |
| 0.80 | HiRate D60 | 9,835 | 95.0 | 1.0 | Baseline |
| 0.25 | Formulation (A) | 9,703 | 95.0 | 1.0 | −132 |
| 0.30 | Formulation (A) | 9,467 | 95.0 | 1.5 | −368 |
| 0.35 | Formulation (A) | 9,103 | 95.0 | 2.25 | −732 |
| 0.40 | Formulation (A) | 9,114 | 95.0 | 2.50 | −721 |

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An aqueous formulation, said formulation comprising:
a polymer (AA) which includes acrylamido repeat units, wherein said Polymer (AA) has a molecular weight of at least 200,000 Daltons;
(ii) water;
(iii) a quaternary ammonium compound.

2. A formulation according to claim 1, wherein said formulation includes at least 5 wt % of said polymer (AA); and/or said formulation includes less than 60 wt % of said polymer (AA); and
wherein said formulation includes at least 5 wt % of water; and/or said formulation includes less than 80 wt % of water.

3. A formulation according to claim 1, wherein said formulation includes 5 to 60 wt % of polymer (AA), 10 to 70 wt % of water and 5 to 50 wt % of said quaternary ammonium compound.

4. A formulation according to claim 1, wherein said polymer (AA) is selected from an ionic polyacrylamide and a neutral polyacrylamide.

5. A formulation according to claim 1, wherein said polymer (AA) includes a repeat unit of formula I

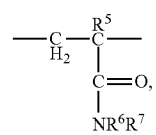

wherein $R^5$, $R^6$ and $R^7$ independently represent a hydrogen atom or an optionally-substituted $C_{1-4}$ alkyl group.

6. A formulation according to claim 1, wherein said polymer (AA) includes:
a repeat unit of formula II which is preferably in combination with a repeat unit of formula I, wherein said repeat unit of formula II comprises a moiety:

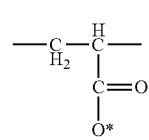

wherein the O* moiety is an O⁻ moiety or is covalently bonded to another atom or group; or
a repeat unit comprising a vinyl pyrrolidone moiety; or
a repeat unit comprising a moiety of formula III

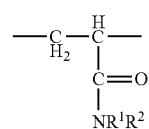

wherein $R^1$ and $R^2$ are independently selected from a hydrogen atom and an optionally-substituted alkyl group.

7. A formulation according to claim 1, wherein said polymer (AA) includes a repeat unit comprising a moiety of formula III

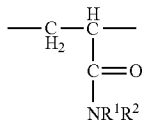

wherein $R^1$ and $R^2$ are independently selected from a hydrogen atom and an optionally-substituted alkyl group, wherein at least one of $R^1$ and $R^2$ includes an alkyl group incorporating an —$SO_3R^3$ moiety wherein $R^3$ is selected from a hydrogen atom and a cationic moiety.

8. A formulation according to claim 1, wherein said polymer (AA) includes anionic repeat units which include sulfonate moieties, wherein said anionic repeat units are selected from styrene sulfonate and AMPS-based repeat units.

9. A formulation according to claim 1, wherein said polymer (AA) includes 1-50 mol % of anionic co-monomeric moieties, selected from acrylate and AMPS-based repeat units.

10. A formulation according to claim 1, wherein said polymer (AA) has a molecular weight of at least 1,000,000 Daltons.

11. A formulation according to claims 1, wherein said polymer (AA) is dispersed in said aqueous formulation as solid discrete particles in the form of powder, granules or flake.

12. A formulation according to claim 1, wherein said quaternary ammonium compound includes a quaternary ammonium cation and an anionic moiety, wherein said quaternary ammonium compound includes a moiety

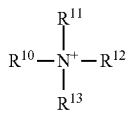

wherein $R^{10}$, $R^{11}$, $R^{12}$ and $R^{13}$ is each individually an optionally substituted alkyl (eg an aryl substituted alkyl) alkenyl or aryl group; or two of groups $R^{10}$, $R^{11}$, $R^{12}$ and $R^{13}$ together define a cyclic structure;

wherein the anionic moiety is selected from a halide, salicylate, oxalate, bicarbonate, bitartarate, citrate, carbonate, dihydrogen citrate, nitrate, nitrite, phosphate, sulfate and sulfonate.

13. A formulation according to claim 12, wherein $R^{10}$, $R^{11}$, $R^{12}$ and $R^{13}$ is independently selected from hydroxyalkyl groups, especially hydroxymethyl, 1-hydroxyethyl, 2-hydroxyethyl, 2-hydroxypropyl, 3-hydroxypropyl, benzyl and $C_{1-25}$, preferably $C_{1-10}$ hydrocarbyl groups, especially methyl, ethyl, propyl, isopropyl and butyl.

14. A formulation according to claim 1, wherein a cation of said quaternary ammonium compound is selected from choline, tetramethylammonium, tetraethylammonium, tetrapropylammonium, tetrabutylammonium and imidazolinium; and an anion of said quaternary ammonium compound is selected from chloride, bromide and iodide.

15. A formulation according to claim 1, wherein said quaternary ammonium compound is selected from choline chloride, tetramethyl ammonium chloride, tetraethylammonium chloride and tetrapropyl ammonium chloride.

16. A formulation according to claim 1, wherein said quaternary ammonium compound is a tetraalkylammonium compound.

17. A formulation according to claim 1, wherein said aqueous formulation includes a salt (BB) in addition to components (i), (ii) and (iii), wherein said salt (BB) is not a quaternary ammonium compound.

18. A formulation according to claim 17, wherein said formulation includes at least 2 wt % of said salt (BB); and said formulation includes less than 30 wt % of said salt (BB); and wherein the sum of the wt % of said quaternary ammonium compound and said salt (BB) is at least 20 wt % and said sum is less than 70 wt %.

19. A formulation according to claim 18, wherein said salt (BB) is an alkali or alkaline earth metal salt.

20. A formulation according to claim 19, wherein the counter-ion of said salt (BB) is a halide.

21. A formulation according to claim 18, wherein, in said formulation, the ratio of the wt % of salt (BB) divided by the wt % of said quaternary ammonium compound is in the range 0.01 to 10.

22. A formulation according to claim 1, wherein said formulation includes 0-5 wt % of a suspending agent which is a clay suspending agent.

23. A formulation according to claim 1, wherein said formulation is not a gel and/or does not gel.

24. An aqueous formulation according to claim 1, said formulation comprising:
5-45 wt %, of a polymer (AA) which includes acrylamido repeat units;
water;
5-50 wt % of a quaternary ammonium compound which is a choline salt; and
2-30 wt % of a calcium or magnesium halide.

25. A formulation according to claim 1, wherein:
said polymer (AA) includes 1-50 mol % of anionic co-monomeric moieties, selected from acrylate and AMPS-based repeat units;
said quaternary ammonium compound is selected from choline chloride, tetramethyl ammonium chloride, tetraethylammonium chloride and tetrapropyl ammonium chloride;
said aqueous formulation includes a salt (BB) in addition to components (i), (ii) and (iii), wherein said salt (BB) is not a quaternary ammonium compound;
said formulation includes at least 2 wt % of said salt (BB) and said formulation includes less than 30 wt % of said salt (BB);
the sum of the wt % of said quaternary ammonium compound and said salt (BB) is at least 20 wt % and said sum is less than 70 wt %; and
in said formulation, the ratio of the wt % of salt (BB) divided by the wt % of said quaternary ammonium compound is in the range 0.01 to 10.

26. A formulation according to claim 1, wherein polymer (AA) is dispersed in said aqueous formulation as solid discrete particles, wherein said particles have a mean particle diameter of at least 300 μm.

27. A formulation according to claim 26, wherein at least 90 wt % of said particles of said polymer (AA) have a diameter greater than 20 μm.

28. A method of preparing a treatment fluid, the method comprising:
(a) selecting an aqueous formulation according to claim 1; and
(b) contacting the aqueous formulation with water.

29. A method according to claim 28, wherein, at some stage in the method, said treatment fluid includes 2.9 to 54 wt % of proppants.

30. A treatment fluid, prepared as described in claim 28, the treatment fluid comprising:
(i) a polymer (AA) which includes acrylamido repeat units;
(ii) water; and
(iii) a quaternary ammonium compound.

31. A treatment fluid according to claim 30 which is a fracturing fluid.

32. A method of treatment which comprises:
(A) selecting a treatment fluid prepared in a method comprising:
(a) selecting an aqueous formulation according to claim 1; and
(b) contacting the aqueous formulation with water; and
(B) contacting an area to be treated with said treatment fluid.

33. A method according to claim 32, wherein said treatment is selected from: slick water fracturing, water treatment, enhanced oil recovery, drilling, erosion control, dust abatement and mining flotation operations.

34. An aqueous formulation, said formulation comprising:
(i) a polymer (AA) which includes acrylamido repeat units, wherein said polymer (AA) has a molecular weight of at least 500,000 Daltons;
(ii) water;
(iii) a quaternary ammonium compound; and
wherein polymer (AA) is dispersed in said aqueous formulation as solid discrete particles, wherein said particles have a mean particle diameter of at least 300 μm.

35. A formulation according to claim 34, wherein said aqueous formulation includes a salt (BB) in addition to components (i), (ii) and (iii), wherein said salt (BB) is an alkali or alkaline earth metal salt, wherein the counter-ion of said salt (BB) is a halide.

36. A formulation according to claim 35, wherein, in said formulation, the ratio of the wt % of salt (BB) divided by the wt % of said quaternary ammonium compound is in the range 0.01 to 10 and the sum of the wt % of said quaternary ammonium compound and said salt (BB) is at least 20 wt % and said sum is less than 70 wt %.

* * * * *